May 19, 1964  N. J. HICKLY  3,133,405
TIME REGISTERING DEVICE
Filed June 1, 1961

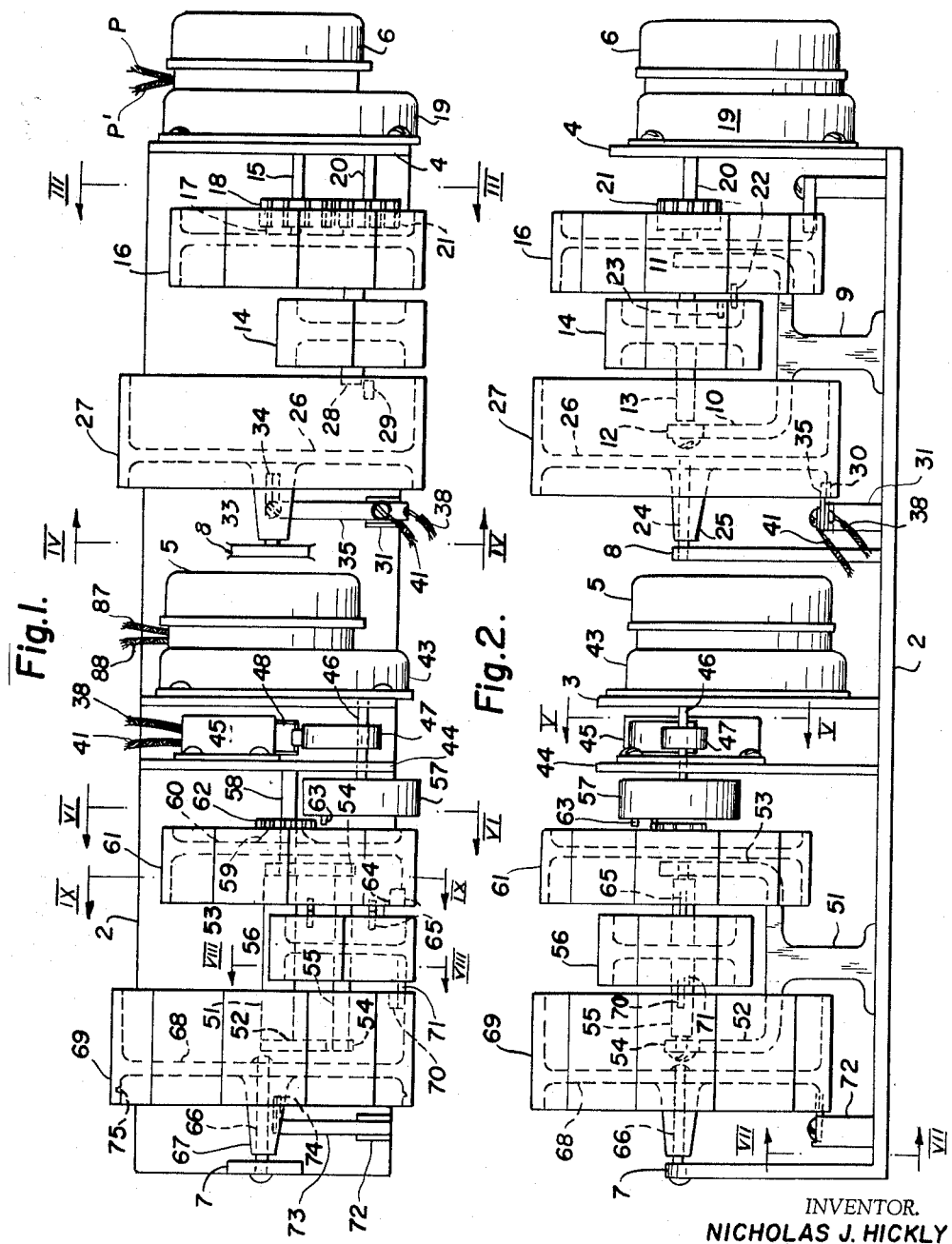

INVENTOR.
NICHOLAS J. HICKLY
BY
Christy, Parmelee & Strickland
his ATTORNEYS

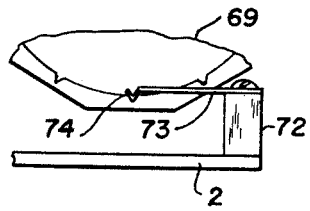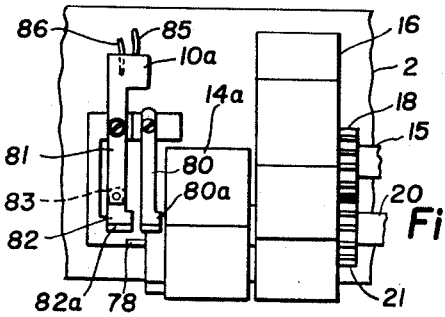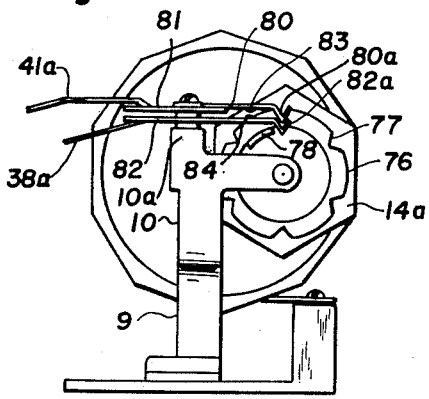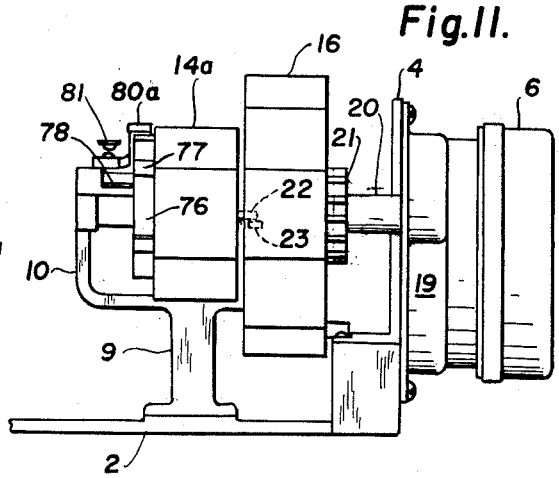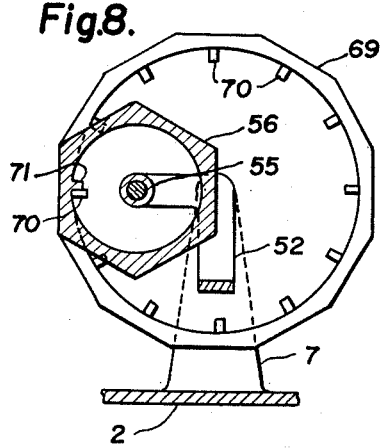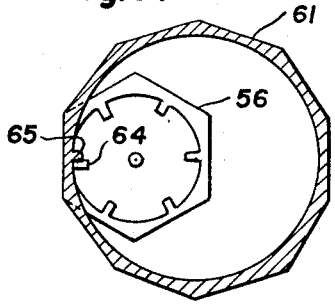

United States Patent Office 3,133,405
Patented May 19, 1964

3,133,405
TIME REGISTERING DEVICE
Nicholas J. Hickly, Whitehall Borough, Allegheny County, Pa., assignor to Pennwood Numechron Company, Pittsburgh, Pa., a corporation of Pennsylvania
Filed June 1, 1961, Ser. No. 114,208
2 Claims. (Cl. 58—125)

This invention relates to time counting devices, registering hours, minutes and seconds for direct reading thereof. Such a device may be constructed for registering the hours over a twelve or a twenty-four hour period. It has separate fields of use both as an ordinary horological device and a commercial device for measuring time intervals in seconds.

Accurate indications of small increments of time, particularly for visual observation, finds many uses in industry and in communication systems. One object of the invention is to provide a recording device which accurately records passage of seconds by successive changes in the recording device and the end of each second interval displays such recording in fixed position.

Another object of the invention is to provide such a device with means for accumulating such seconds of time and recording them as hours, minutes and seconds, for totals of twelve or twenty-four hour periods.

Another object of the invention is to provide a device of the character described comprised of simple devices which are accurately and continuouly actuated electrically.

A further object of the invention is to provide a device of the character described which may be manually adjusted without the necessity for interruption of the electrical actuating device.

These and other objects of the invention will be made apparent from the following specification and the drawing forming a part thereof, wherein:

FIG. 1 shows a plan view of the mechanism and supporting chassis, apart from the housing therefor;

FIG. 2 shows a front elevation of the mechanism and chassis of FIG. 1;

FIGS. 7, 8 and 9 show sections taken on lines VII—VII, VIII—VIII and IX—IX of FIGS. 1 and 2;

FIGS. 11, 12 and 13 illustrate a modified form of the motor 6 and dial train associated therewith.

Figure 3:
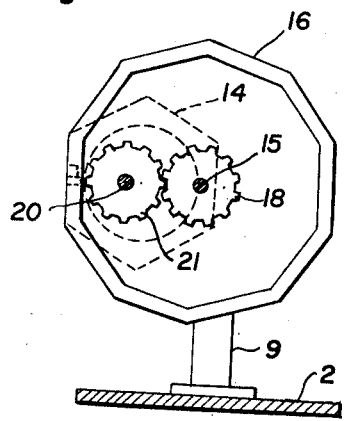
FIG. 3 shows a section through the mechanism at lines III—III of FIG. 1.

The mechanism hereinafter described is to be mounted in any suitable casing or housing. Suitable windows will be provided in the face of the casing through which the recording dials will be visible.

The mechanism comprises a base 2, shown as of elongated rectangular form. Intermediate the ends of the base is an upstanding bracket 3. At one end of the base is an up-standing bracket 4. Mounted on the brackets 3 and 4 are synchronous motors 5 and 6, respectively. At the opposite end of the base 2 and also adjacent motor 5 are up-standing brackets 7 and 8 respectively.

Intermediate brackets 4 and 8 is a post 9 secured to the base 2 and extending upwardly therefrom. Post 9 has two up-standing spaced arms 10 and 11. Each arm 10 and 11 has a forward extension 12 in which is journaled a shaft 13 carrying a dial 14. This dial is a six-sided polygon, carrying the numerals 0 to 5 on the sides thereof. Extending towards dial 14 from bracket 4 is a shaft 15 rigidly secured to the bracket. Journaled on shaft 15 is a drum-shaped dial 16 provided with a hub 17 carrying a sprocket 18 which rotates concurrently therewith. The housing of adjacent motor 6 has thereon a gear drive 19 provided with a shaft 20 upon which is secured a gear 21 meshing with sprocket 18, whereby the dial 16 is caused to make one complete revolution every ten seconds. Dial 16 is a ten-sided polygon carrying the numerals 0 to 9 on the sides thereof.

Figure 4:
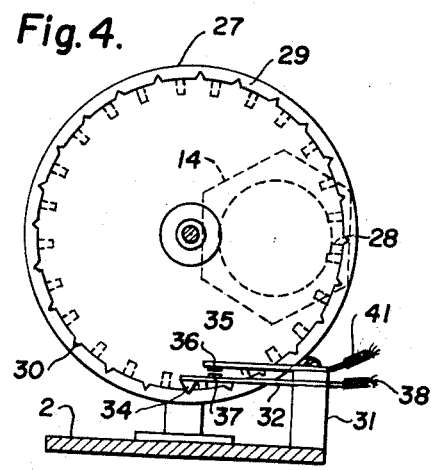
FIG. 4 shows a section through the mechanism at line IV—IV of FIG. 1.
Figure 5:
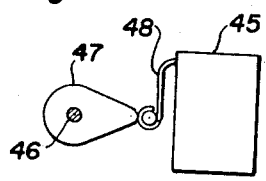
FIG. 5 shows a section taken on lines V—V of FIG. 2, illustrating the micro-switch and control mechanism.
Figure 6:
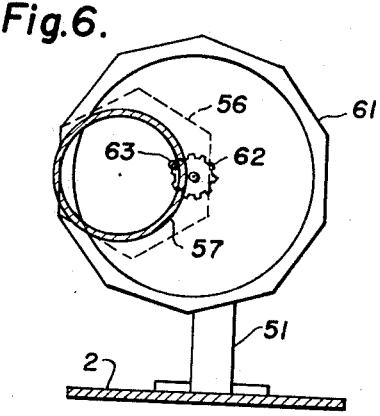
FIG. 6 shows a section taken on lines VI—VI of FIG. 1, illustrating actuation of the seconds totaling mechanism.
Figure 10:
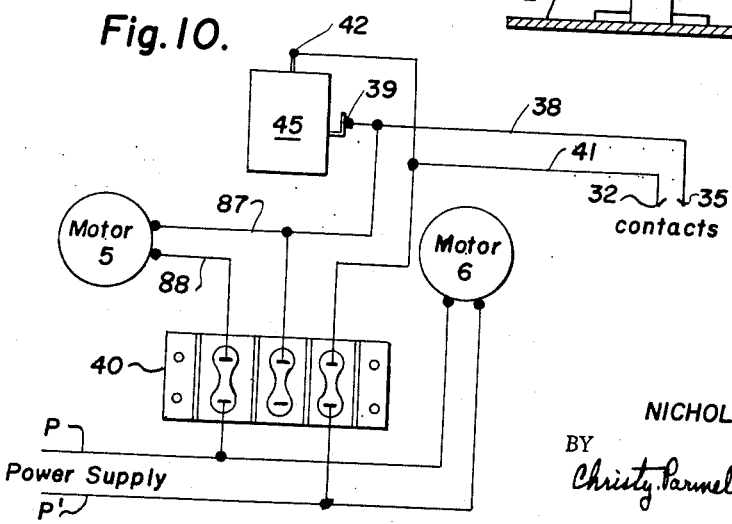
FIG. 10 shows a wiring diagram of the device of FIG. 2.

As shown in FIGS. 1 and 3, the dial 16 has a single lug 22 thereon adjacent the inner periphery thereof engaging a single arm 23 on the inner periphery of dial 14, whereby upon one complete revolution of dial 16, dial 14 is caused to rotate one-sixth of a revolution. Journaled in bracket 8 is a spindle 24 carrying a hub 25 supporting the web 26 of wheel 27. Upon the inner periphery of dial 14 is a single lug 28 positioned to be engaged by arms 29 on the inner periphery of wheel 27. At the opposite side of the inner periphery of wheel 27 are a plurality of spaced indentations 30. As seen in FIGS. 2 and 4, adjacent wheel 27 is a member 31 mounted on base 2 and having a resilient arm 32 secured thereto. Said arm 32 extends towards the periphery of wheel 27 and is provided with a laterally extending portion 33 having a V-shaped portion 34 seated in one of the indentations 30 of wheel 27. Secured to member 31 above arm 32 is a member 35 overlying arm 32. Abutments 36 and 37 are mounted on arm 35 and member 32, respectively. Said abutments are in vertically spaced relation when V-shaped portion 34 is seated in one of indenations 30 and are engaged when the V-shaped portion 34 is raised upon rotation of wheel 27 to advance the V-shaped portion 34 to an adjacent indentation 30. Arm 32 has a wire 38 extending therefrom to contact 39 of micro-switch 45. Member 32 has a wire 41 extending therefrom to contact 42 of micro-switch 45.

Associated with motor 5 is a gear drive 43 secured to bracket 3. Disposed in spaced relation to bracket 3 is bracket 44 to which is secured the micro-switch 45. Disposed between brackets 3 and 44 is a shaft 46 journaled therein and connected with gear drive 43. A cam 47 secured to said shaft 46 and rotating therewith engages and depresses a contact arm 48 to break the circuit through switch 45, the wires 41 and 38 and a power source P.

Disposed between brackets 44 and 7, and mounted on base 2 is a post 51 provided with spaced arms 52, 53 having extensions 54 thereon. A shaft 55 journaled in extensions 54 has mounted thereon a drum-shaped dial 56, in the form of a six-sided polygon having on the sides thereof the numerals 0 to 5. The shaft 46 extends through bracket 44 and has mounted thereon the wheel 57. A fixed shaft 58 on bracket 44 has journaled thereon a hub 59 secured at one end to web 60 of a drum-shaped dial 61 and upon the other end has a ratchet wheel 62. The dial 61 is a ten-sided polygon having numerals 0 to 9 on the sides thereof. An arm 63 on the inner peripheral face of wheel 57 is adapted to engage with ratchet 62 and impart rotation thereto so as to advance the dial 61 one dial side before passing out of engagement with ratchet 62. Dial 61 has on the inner peripheral face thereof a laterally extending arm 64 adapted to overlap and engage with a lug 65 which is disposed upon the inner peripheral face of dial 56 and beneath the middle of each dial side, whereby one complete rotation of dial 61 rotates dial 56 to advance same one dial side.

Mounted on bracket 7 is a fixed shaft 66 having journaled thereon a hub 67 secured in fixed relation to the web 68 of a drum-shaped dial 69. The dial 69 may be a twelve or twenty-four sided polygon having numerals 0 to 11 or 0 to 23 as desired. On the inner peripheral face at the side of the web 68 opposite the hub 67, the dial 69 beneath each dial side is provided with an arm 70 extending laterally towards dial 56 in overlapping relation to the inner peripheral face thereof. Upon said inner peripheral face of dial 56 is a lug 71 which in each complete rotation of dial 56 rotates the dial 69 a distance to advance the dial one numeral. Mounted on base 2 is a member 72 having secured thereto a resilient member 73 extending transversely of the lower periphery of dial 69 and having a lug 74 extending laterally therefrom in overlapping relation thereto. A V-shaped depending portion on lug 74 engages similarly shaped spaced depressions 75 on the inner face of the periphery of dial 69. The number of depressions 75 corresponding to the number of numerals on the face of the dial 69.

The apparatus hereinbefore described drives the ten-sided dial 16 one complete revolution every ten seconds, each revolution of dial 16 advances the six-sided dial 14 one-sixth of a revolution. One revolution of dial 14 advances wheel 27 one increment of movement between V-shaped recesses 30 on the inner periphery of wheel 27. Movement of wheel 27 raises arm 32 and contact 37 thereon to engage contact 36 on arm 36 closing the circuit between wires 38 and 41 to actuate motor 5 acting through gear drive 43 to cause shaft 46 to rotate cam 47. Cam 47 is normally in contact with micro-switch cam 48 and depresses same opening circuit through wires 49' and 50'. As cam 47 rotates one revolution it first moves away from switch arm 48 and then re-engages said arm to cut off the circuit through motor 5. During rotation of cam 47 it also drives wheel 57 and arm 63 thereon to engage dial 61 having 10 faces thereon and advances dial 61 one face. One complete rotation of dial 61 equals ten minutes, one complete rotation of dial 56 advances six-faced dial 56 one face, one complete rotation of dial 56 equals one hour and advances dial 69 one dial face.

Thus dials 14 and 16 register sixty seconds every minute. Dial 61 registers minutes 1 to 10, dial 56 registers intervals of ten minutes from 1 to 6 or one hour and dial 69 registers hours.

Each dial 14, 61, 56 and 69 has a side thereof in fixed position during the time increment measured thereby. Reading dials 61, 14 and 16 gives minutes and seconds. Reading dials 69, 56 and 61 gives hours and minutes 1 to 60.

Dial 14 has not been shown with means for retaining each dial face thereof in fixed transverse alignment, for one minute intervals, with the position of each face of dial 16 at the end of each second, but this can be obtained by use of a resilient arm 80 and lateral extension 80a engaging a hub portion 76 disposed on dial 14a as shown in FIG. 11.

Referring now to FIGS. 11 to 13 of the drawing, wherein is shown a modification of the apparatus of FIGS. 1 and 2 whereby each accumulation of sixty second time intervals is transferred to the dial train actuated by the motor 5.

Here in FIGS. 11 to 13, the continuously running motor 6, acting through gear box 19, shaft 20 and gears 21 and 18 advances dial 16 one dial face during each time interval of one second. Each complete rotation of dial 16 acting through members 22, 23 advances dial 14a, one dial face. Dial 14a, as shown in FIGS. 11 and 13, has at the left side thereof an integral hollow hub portion 76 having on the outer face thereof spaced indentations 77 and on the inner periphery thereof a single outwardly projecting arm 78. Mounted on the adjacent portion 10a of upstanding arm 10 of the stand 9 is a resilient arm 80 having a V-shaped portion 80a successively engaging in the indentations 77 of hub 76. Mounted on said arm 10, outwardly of resilient arm 80, are a pair of vertically spaced arms 81 and 82. Arm 82 has a V-shaped portion 82a disposed in the path of movement of arm 78. Said latter arms having mounted thereon spaced opposing contact members 83 and 84. Upon each complete rotation of dial 14a, representing an accumulation of sixty seconds, the arm 78 engages 82a and raises lower arm 82 to close contacts 83 and 84. As the arm 78 moves past arm 82, the latter moves downwardly to open the contact between members 83 and 84. The arms 81 and 82, by means of the wires 41a and 38a are connected in circuit with a power source and the motor 5. During the interval of closing and opening the contacts 83, 84, the motor 5 drives cam 47 to open micro-switch 45.

The basic mechanism of FIGS. 1 and 2, and as modified by FIGS. 11 to 13, provides dials reading hours and minutes at the left side of the base 2 and seconds in intervals of one to fifty-nine at the right side of the base. The dials recording seconds advance only at the end of each second interval, whereby any time interval between 0 to 59 may be seen at a glance. The dials recording hours and minutes change only at the end of each interval of one minute.

The segments of the herein described mechanisms have also been found to have utility apart from the other portions of the mechanism. Thus the motor 6 and associated dials 16 and 14 will uniformly register accumulated time in intervals of seconds. The motor 6 and associated dials 16, 14 and 27 may be utilized to give an impulse to motor 5 and its associated dials even though the latter are remotely situated relative to motor 6. It will also be apparent that motor 5, operating only intermittently need not be a synchronous motor not necessarily operated by alternating current.

The apparatus disclosed in FIGS. 1 and 2, along with modifications of FIGS. 11 to 13, may be utilized as a second by second digital clock to record time in five digits over 12 or 24 hour intervals.

The latter apparatus may also be utilized as a second by second elapsed time readout digital computer, for time intervals of 30 minute, 60 minute, 12 hour or 24 hour periods. Thus for 60 minutes of elapsed time, dial 69 may be omitted or blanked off. For thirty minutes of elapsed time, dial 69 may be omitted and dial 56 printed with numerals 0–1–2, 0–1–2. For a 12 hour elapsed time, dial 69 may be a 12 sided polygon with numerals printed 0 to 11. For a 24 hour elapsed time readout the present dial 69 may be used as a circular dial printed with twenty-four numerals 00 to 23.

Having described the mechanism in its presently preferred form, and several modifications thereof, it will be apparent to those skilled in the art that changes in details of construction may be made without departing from the invention as defined by the scope of the appended claims.

I claim:

1. Apparatus for computing elapsed time for thirty minutes in intervals of one second comprising a continuously running motor and gear case driving a train of two drum-shaped dials, the first dial being a ten-sided polygon bearing numerals from 0 to 9 on the sides thereof and the second dial being a six-sided polygon bearing numerals from 0 to 5 on the sides thereof, means on said first dial for advancing said second dial a distance of one dial side for each revolution of the first dial, a second motor and gear case for driving a second train of two drum-shaped dials, the first dial of the second train being a ten-sided polygon bearing numerals from 0 to 9 on the sides thereof, the second dial of said second train being of polygonal shape bearing numerals of 0 to 2 on successive faces, and means connecting the second dial of the first train with the motor of the second train and a power source for actuating the second motor to advance the first dial of the second train one dial face, and means on said second dial of the first train for pulsing the second means to activate said second motor.

2. Apparatus as defined in claim 1 wherein said second dial train is comprised of three drum-shaped dials, the second dial of the train being a six-sided polygon bearing numerals of 0 to 5 on the sides thereof, the third dial being a twelve-sided polygon bearing numerals of 0 to 11 upon the peripheral sides thereof, and means mounted on the second dial of the train for engaging the third dial upon one complete revolution to advance the third dial side one numeral.

References Cited in the file of this patent

UNITED STATES PATENTS

| | | |
|---|---|---|
| 444,433 | Hammer | Jan. 13, 1891 |
| 1,920,838 | Butts | Aug. 1, 1933 |
| 1,981,997 | Freel | Nov. 27, 1934 |
| 1,990,645 | Greenawalt | Feb. 12, 1935 |
| 1,991,241 | Bourquin | Feb. 12, 1935 |
| 2,072,457 | Larrabee | Mar. 2, 1937 |
| 3,002,685 | Tellep | Oct. 3, 1961 |

FOREIGN PATENTS

| | | |
|---|---|---|
| 825,674 | Germany | Dec. 20, 1951 |